(12) United States Patent
Petersen et al.

(10) Patent No.: US 7,899,890 B2
(45) Date of Patent: Mar. 1, 2011

(54) MANAGED NODE INITIAL OPERATIONAL STATE

(75) Inventors: Robert Petersen, Linkoping (SE); Edwin Tse, Montreal (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 12/783,887

(22) Filed: May 20, 2010

(65) Prior Publication Data

US 2010/0235478 A1  Sep. 16, 2010

Related U.S. Application Data

(63) Continuation of application No. 12/138,111, filed on Jun. 12, 2008, now Pat. No. 7,747,712.

(51) Int. Cl.
  *G06F 15/177* (2006.01)
(52) U.S. Cl. .................. 709/220; 709/222; 709/203; 709/223; 709/224; 709/246; 370/248; 370/241; 370/253; 714/4; 714/25; 714/48
(58) Field of Classification Search ......... 709/220–227, 709/201–205
  See application file for complete search history.

(56) References Cited

U.S. PATENT DOCUMENTS 6,385,728 B1  5/2002  DeBry

| | | |
|---|---|---|
| 7,506,009 B2 | 3/2009 | Singh et al. |
| 7,747,712 B2 * | 6/2010 | Petersen et al. ............. 709/222 |
| 2006/0123428 A1 | 6/2006 | Burns |
| 2006/0259594 A1 | 11/2006 | Paliwal et al. |

FOREIGN PATENT DOCUMENTS

WO  WO 2008/041213 A2  4/2008

OTHER PUBLICATIONS

Co-pending U.S. Appl. No. 12/138,111, filed Jun. 12, 2008 entitled "Managed Node Initial Operational State" by Robert Petersen et al., 50 pages.
Notification of Transmittal of the International Search Report and the Written Opinion of the International Searching Authority, or the Declaration, corresponding to PCT/SE2009/050547, mailed Sep. 28, 2009, 9 pages.
Sohrabi et al., "Protocols for Self-Organization of a Wireless Sensor Network," IEEE Personal Communications, pp. 1-35, 2000.
"Self-organization", www.wikepedia.com, Apr. 7, 2008, pp. 1-10.
"Telecommunication management; Study of Self-Organising Networks (SON) Related OAM for Home NodeB", 3GPP TR 32.821 V0.2.4, (Release 8), pp. 1-9, 2008.

* cited by examiner

*Primary Examiner*—Jude J Jean Gilles
(74) *Attorney, Agent, or Firm*—Myers Bigel Sibley & Sajovec, P.A.

(57) ABSTRACT

A device associated with a network receives a fetch request from a managed node connected to the network, and provides, to the managed node, trigger information specifying one or more conditions under which the managed node is to be enabled and is to receive traffic from the network. The device also receives an operational state associated with the managed node based on the trigger information.

1 Claim, 15 Drawing Sheets

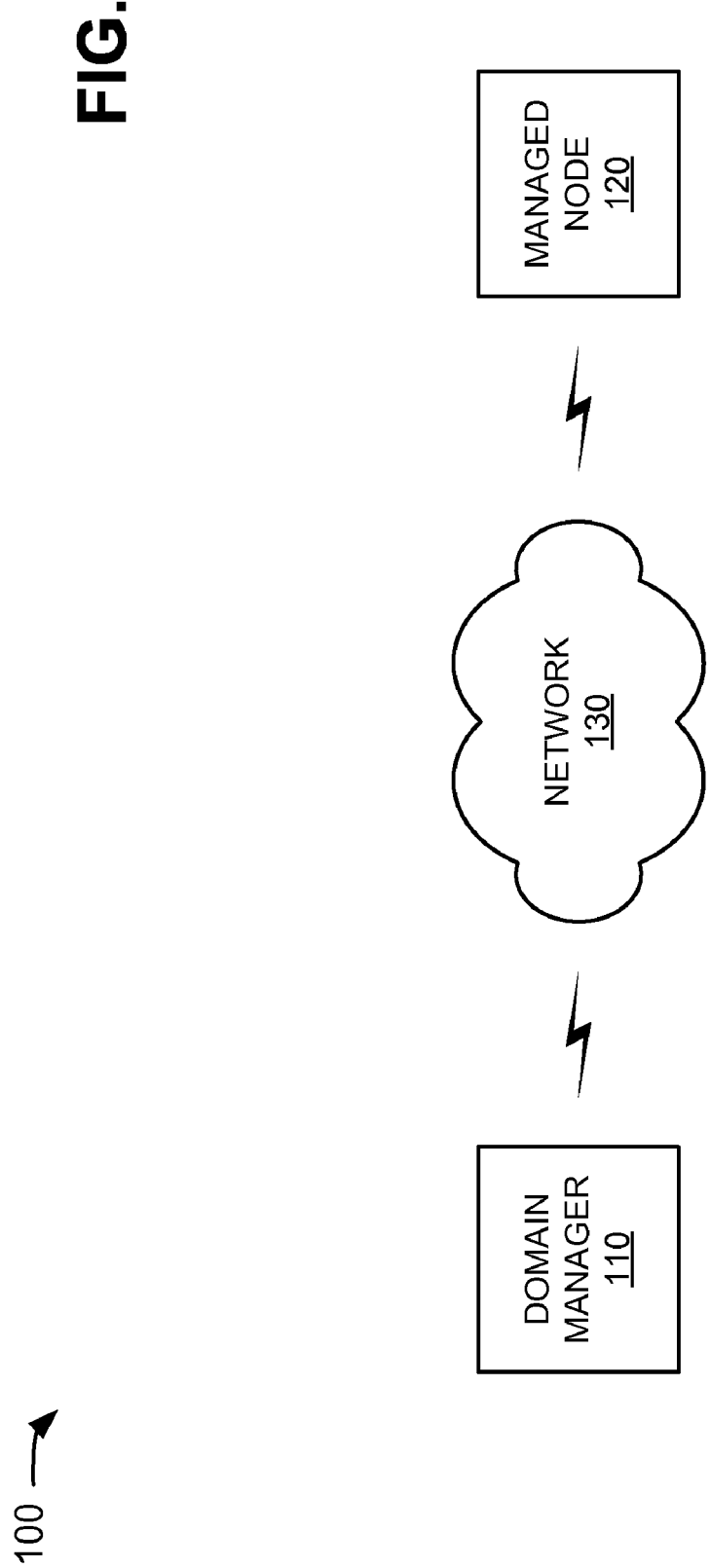

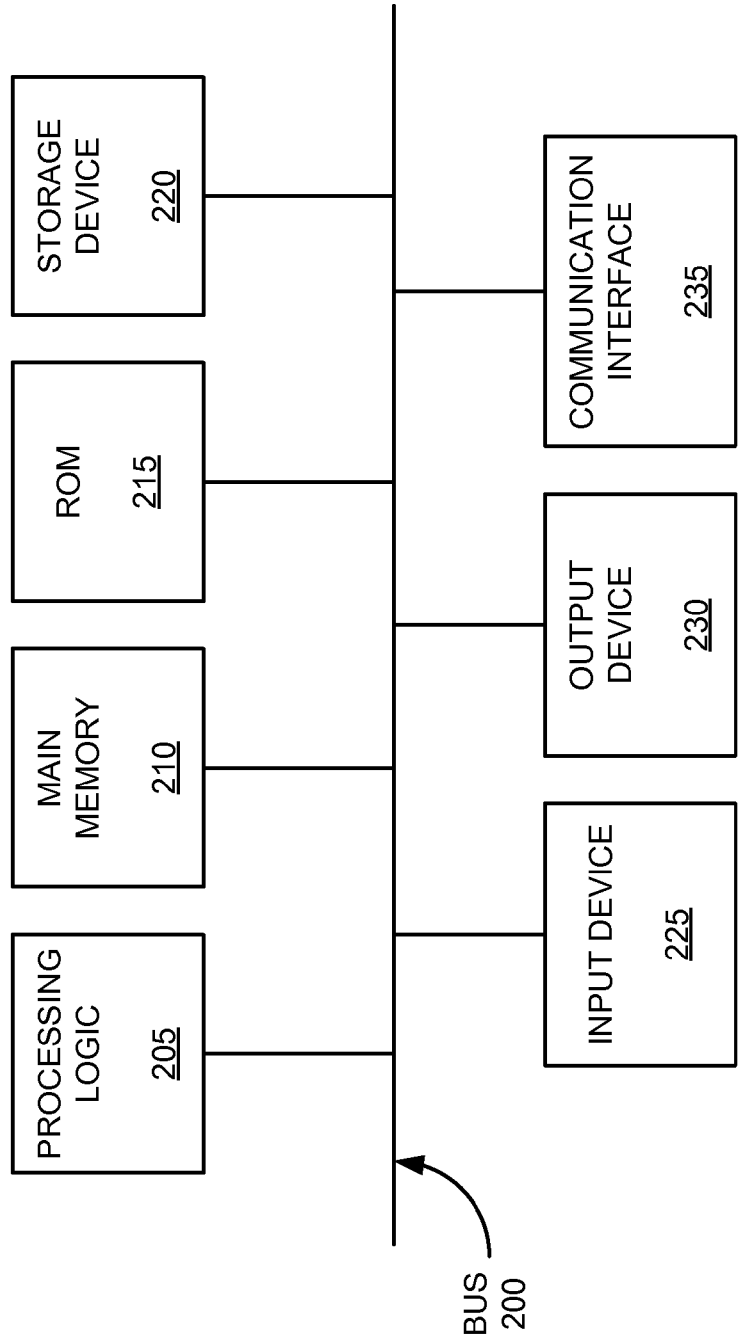

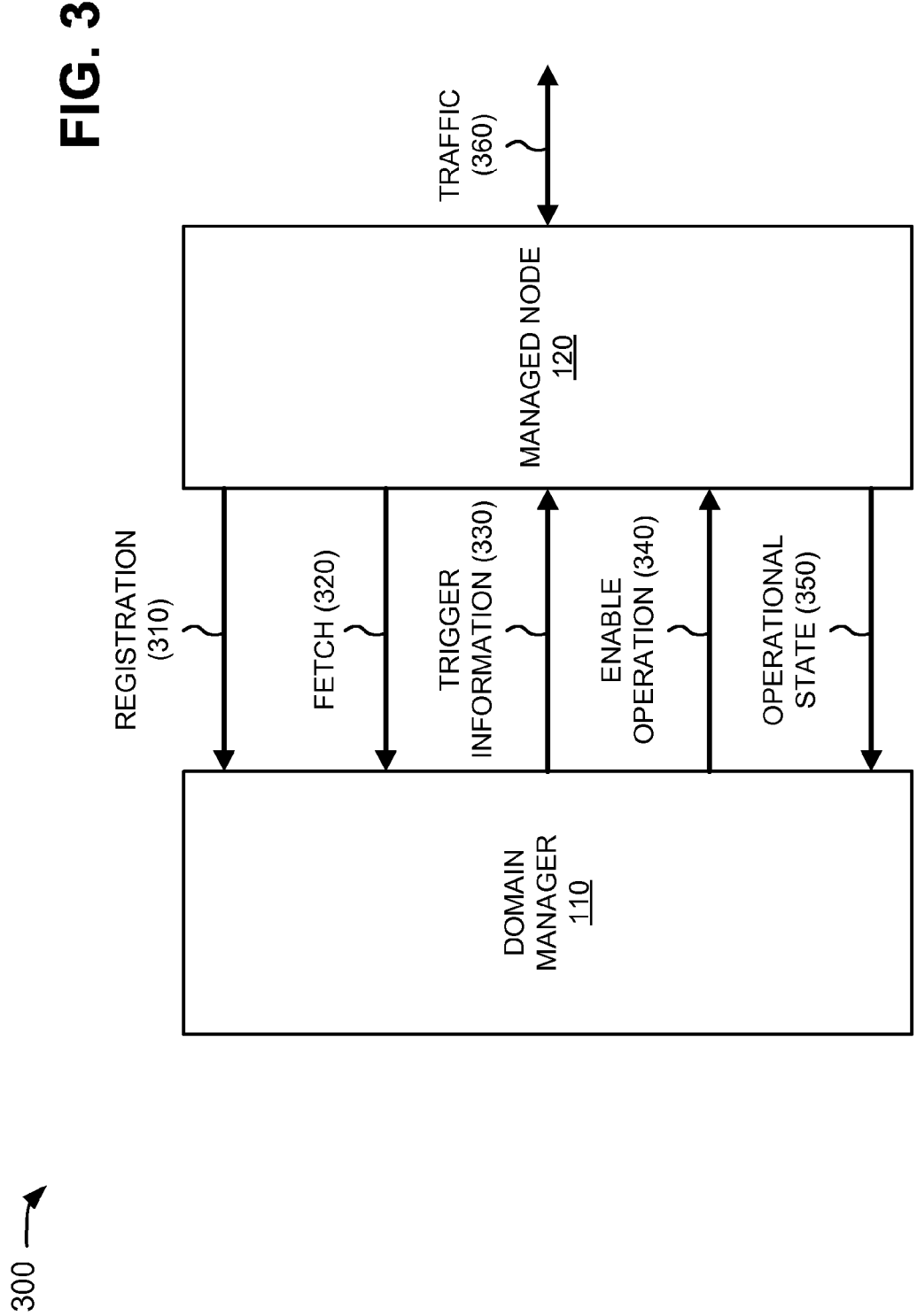

MANAGED NODE INITIAL OPERATIONAL STATE

RELATED APPLICATION

This application is a continuation of U.S. patent application Ser. No. 12/138,111 filed Jun. 12, 2008, which is incorporated herein by reference.

TECHNICAL FIELD

Embodiments described herein relate generally to communication systems, and, more particularly, to providing an initial operational state for a managed node installed in a telecommunication system.

BACKGROUND

A self-organized network (SON) may provide mechanisms for self-configuration, self-discovery, and/or self-organization. Self-configuration and self-discovery enable network devices of the SON to be transparent to ordinary users (e.g., network operators and administrators). Self-organization ensures robustness of the SON during dynamic network topology changes and link breakages. It also ensures optimal and efficient bandwidth utilization.

One device used in a SON is a managed node (e.g., a radio base station). Self organization may enable the managed node to configure itself and initiate operations (e.g., to carry user traffic without much guidance or management by an outside entity). Recently, self organization has been utilized in the management of large telecommunication systems. The need for self organization in management of large telecommunication systems stems from a network operator's goal to reduce costs of network management. Since self organization enables a managed node to manage itself without much guidance from the network operator, a SON is an attractive mechanism to achieve the network operator's goal for management of today's large and dynamic telecommunication systems.

SON-based managed nodes have several disadvantages. For example, when the SON-based managed node is installed (e.g., connected to a network and turned on), the managed node may begin operating and carrying user traffic. However, an installation time associated with a SON-based managed node cannot be predicted by the network operator because installation is typically carried out by a managed node user at his/her convenience and not according to the network operator's plans. From the network operator's view point, an installation time of the SON-based managed node may not be the opportune time for the managed node to carry user traffic. Furthermore, when the SON-based managed node is installed, the managed node is unable to support a dialog (e.g., for purposes of identification) with a network operation and management (OAM) system (e.g., a domain manager).

SUMMARY

It is an object of the invention to overcome at least some of the above disadvantages and to provide an initial operational state for a managed node installed in a telecommunication system.

Embodiments described herein may include systems and/or methods that provide an initial operational state for a managed node (e.g., a network device, such as radio base station). For example, in one embodiment, the systems and/or methods may include a managed network (e.g., a SON) that includes a domain manager for managing one or more managed nodes and/or links. A network operator may plan a configuration of the managed network (e.g., in wireless network management, the network operator may prepare a "pre-plan" that captures configuration information associated with the managed nodes). Such a pre-plan may be provided to and implemented by the domain manager. The pre-plan implemented by the domain manager may include a parameter (or instruction) indicating a trigger point when a managed node (e.g., a SON-based managed node) should enter an operational (e.g., enabled) state to carry user traffic.

In one embodiment, when the managed node is installed in the managed network, the managed node may not enter the operational state, even if it is capable of entering the operational state. Instead, based on the parameter provided by the domain manager, the managed node may remain in a disabled operational state. Unlike current telecommunication systems which are unable to predict the installation time of the managed node and to initiate a dialog with the managed node, the embodiments described herein may permit the domain manager to initiate a dialog with the managed node (e.g., prior to enabling operation of the managed node), and to determine when the managed node is to become operational.

In an exemplary embodiment, systems and/or methods described herein may receive registration information associated with a managed node, and may receive a fetch request from the managed node. The systems and/or methods may retrieve trigger information (e.g., a list of conditions or triggers under which the managed node may enter the operational state) based on the fetch request, and/or may retrieve an enable operation instruction based on the fetch request. The systems and/or methods may provide the trigger information and/or the enable operation instruction to the managed node, and may receive information identifying an operational state (e.g., enabled, disabled, etc.) of the managed node based on the trigger information and/or the enable operation instruction.

BRIEF DESCRIPTION OF THE DRAWINGS

FIG. 1 depicts a diagram of an exemplary network in which systems and/or methods described herein may be implemented;

FIG. 2A illustrates exemplary components of a domain manager of the network depicted in FIG. 1;

FIG. 3 illustrates a diagram of an exemplary portion of the network depicted in FIG. 1 and exemplary interactions among components of the network portion;

DETAILED DESCRIPTION

Figure 2B:
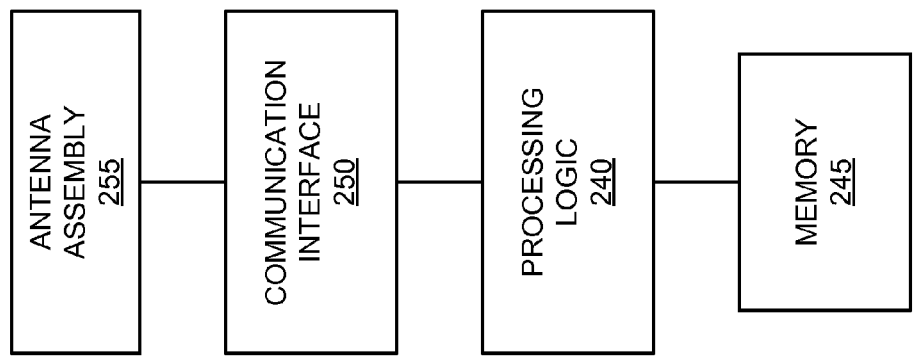
FIG. 2B depicts exemplary components of a managed node of the network depicted in FIG. 1.

The following detailed description refers to the accompanying drawings. The same reference numbers in different drawings may identify the same or similar elements. Also, the following detailed description does not limit the invention.

Embodiments described herein may include systems and/or methods that provide an initial operational state for a managed node so that a domain manager may initiate a dialog with the managed node (e.g., prior to enabling operation of the managed node), and may determine when the managed node is to become operational.

FIG. 1 depicts a diagram of an exemplary network 100 in which systems and/or methods described herein may be implemented. As illustrated, network 100 may include a domain manager 110 and a managed node 120 interconnected by a network 130. Domain manager 110 and managed node 120 may connect to network 130 via wired and/or wireless connections. A single domain manager, managed node, and network have been illustrated in FIG. 1 for simplicity. In practice, there may be more domain managers, managed nodes, and/or networks. Also, in some instances, a component in network 100 (e.g., one or more of domain manager 110 and/or managed node 120) may perform one or more functions described as being performed by another component or group of components in network 100.

Domain manager 110 may include one or more server entities, or other types of computation or communication devices, that gather, process, search, and/or provide information in a manner described herein. For example, domain manager 110 may include a computer, a proxy server, a computer system (e.g., an operational and maintenance system, a network management system, an enterprise management system, etc.), another type of computation or communication device, a thread or process running on one of these devices, and/or an object executable by one of these devices. In one embodiment, domain manager 110 may monitor network elements (e.g., managed node 120), may pinpoint root causes of failures, may diagnose effects of the failures on other, related network elements, etc.

Managed node 120 may include any device capable of receiving traffic associated with network 100, and capable of being monitored and/or managed by domain manager 110. For example, managed node 120 may include a computer, a router, a switch, a network interface card (NIC), a hub, a bridge, a gateway, a firewall, an optical add-drop multiplexer (OADM), a cell phone, a radio base station, a set-top box (STB), some other type of device that processes and/or transfers traffic, another type of computation or communication device, a thread or process running on one of these devices, and/or an object executable by one of these devices. In one embodiment, managed node 120 may include a node of a telecommunication network.

The term "traffic," as used herein, is to be broadly construed to include any information capable of being generated and/or received by network 100 and/or any component of network 100 (e.g., managed node 120), such as information associated with operation, administration, maintenance, provisioning, etc. of telecommunication systems, etc.

Network 130 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks. In one exemplary embodiment, network 130 may include a self-organized network (SON), a SON-based telecommunication network, etc.

FIG. 2A is an exemplary diagram of a device that may correspond to domain manager 110. As illustrated, domain manager 110 may include a bus 200, processing logic 205, a main memory 210, a read-only memory (ROM) 215, a storage device 220, an input device 225, an output device 230, and/or a communication interface 235. Bus 200 may include a path that permits communication among the components of domain manager 110.

Processing logic 205 may include a processor, microprocessor, or other type of processing logic that may interpret and execute instructions. Main memory 210 may include a random access memory (RAM) or another type of dynamic storage device that may store information and instructions for execution by processing logic 205. ROM 215 may include a ROM device or another type of static storage device that may store static information and/or instructions for use by processing logic 205. Storage device 220 may include a magnetic and/or optical recording medium and its corresponding drive.

Input device 225 may include a mechanism that permits an operator to input information to domain manager 110, such as a keyboard, a mouse, a pen, a microphone, voice recognition and/or biometric mechanisms, etc. Output device 230 may include a mechanism that outputs information to the operator, including a display, a printer, a speaker, etc. Communication interface 235 may include any transceiver-like mechanism that enables domain manager 110 to communicate with other devices and/or systems. For example, communication interface 235 may include mechanisms for communicating with another device or system via a network, such as network 130.

As described herein, domain manager 110 may perform certain operations in response to processing logic 205 executing software instructions contained in a computer-readable medium, such as main memory 210. A computer-readable medium may be defined as a physical or logical memory device. The software instructions may be read into main memory 210 from another computer-readable medium, such as storage device 220, or from another device via communication interface 235. The software instructions contained in main memory 210 may cause processing logic 205 to perform processes described herein. Alternatively, hardwired circuitry may be used in place of or in combination with software instructions to implement processes described herein. Thus, implementations described herein are not limited to any specific combination of hardware circuitry and software.

Although FIG. 2A shows exemplary components of domain manager 110, in other implementations, domain manager 110 may contain fewer, different, or additional components than depicted in FIG. 2A. In still other implementations, one or more components of domain manager 110 may perform one or more tasks described as being performed by one or more other components of domain manager 110.

FIG. 2B is an exemplary diagram of a device that may correspond to managed node 120. As illustrated, managed node 120 may include processing logic 240, memory 245, a communication interface 250, and/or an antenna assembly 255.

Processing logic 240 may include a processor, microprocessor, an application specific integrated circuit (ASIC), field programmable gate array (FPGA), or the like. Processing logic 240 may control operation of managed node 120 and its components.

Memory 245 may include a random access memory (RAM), a read only memory (ROM), and/or another type of memory to store data and instructions that may be used by processing logic 240.

Communication interface 250 may include any transceiver-like mechanism that enables managed node 120 to communicate with other devices and/or systems. Communication interface 250 may include, for example, a transmitter that may convert baseband signals from processing logic 240 to radio frequency (RF) signals and/or a receiver that may convert RF signals to baseband signals. Alternatively, communication interface 250 may include a transceiver to perform functions of both a transmitter and a receiver. Communication interface 250 may connect to antenna assembly 255 for transmission and/or reception of the RF signals.

Antenna assembly 255 may include one or more antennas to transmit and/or receive signals (e.g., RF signals) over the air. Antenna assembly 255 may, for example, receive RF signals from communication interface 250 and transmit them over the air and receive RF signals over the air and provide them to communication interface 250. In one exemplary embodiment, for example, communication interface 250 may communicate via a network (e.g., network 130). Alternatively and/or additionally, antenna assembly 255 may be omitted and communication interface 250 may communicate with a network (e.g., network 100) via one or more physical links.

As described herein, managed node 120 may perform certain operations in response to processing logic 240 executing software instructions contained in a computer-readable medium, such as memory 245. A computer-readable medium may be defined as a physical or logical memory device. The software instructions may be read into memory 245 from another computer-readable medium or from another device via communication interface 250. The software instructions contained in memory 245 may cause processing logic 240 to perform processes described herein. Alternatively, hardwired circuitry may be used in place of or in combination with software instructions to implement processes described herein. Thus, embodiments described herein are not limited to any specific combination of hardware circuitry and software.

Although FIG. 2B shows exemplary components of managed node 120, in other embodiments, managed node 120 may contain fewer, different, or additional components than depicted in FIG. 2B. In still other embodiments, one or more components of managed node 120 may perform one or more tasks described as being performed by one or more other components of managed node 120.

FIG. 3 depicts a diagram of an exemplary portion 300 of network 100 and exemplary interactions among components of network portion 300. As illustrated, network portion 300 may include domain manager 110 and managed node 120. Domain manager 110 and managed node 120 may include the features described above in connection with, for example, FIG. 1.

As shown in FIG. 3, managed node 120 may provide registration information 310 to domain manager 110. Registration information 310 may include information identifying managed node 120, information regarding connection of managed node 120 (e.g., to network 100), authentication information, etc. Domain manager 110 may receive registration information 310, and may identify, authenticate, etc. managed node 120 based on registration information 310. Managed node 120 may provide a fetch request 320 to domain manager 110. Fetch request 320 may include information identifying managed node 120, information identifying an operational state of managed node 120, information requesting an initial operational state for managed node 120, etc. Further details of fetch request 320 are provided below in connection with, for example, FIG. 4.

Domain manager 110 may receive fetch request 320, and may retrieve trigger information 330 from storage (e.g., storage device 220) based on fetch request 320. Trigger information 330 may include information specifying conditions under which managed node 120 may enter an operational state (e.g., enabled, disabled, etc.). Further details of trigger information 330 are provided below in connection with, for example, FIG. 5. Alternatively and/or additionally, domain manager 110 may retrieve an enable operation instruction 340 from storage (e.g., storage device 220) based on fetch request 320. Enable operation instruction 340 may include information that changes a state of managed node 120 to an enabled operational state (e.g., managed node 120 may be capable of transmitting/receiving traffic). Further details of enable operation instruction 340 are provided below in connection with, for example, FIG. 6. Domain manager 110 may provide trigger information 330 and/or enable operation instruction 340 to managed node 120.

As further shown in FIG. 3, managed node 120 may receive trigger information 330 and/or enable operation instruction 340, and may determine its operational state 350 (e.g., whether managed node 120 is enabled, disabled, etc.) based on trigger information 330 and/or enable operation instruction 340. For example, in one embodiment, managed node 120 may determine that its operational state is enabled from trigger information 330 (and/or enable operation instruction 340). Managed node 120 may provide operational state 350 to domain manager 110, and domain manager 110 may receive operational state 350. Managed node 120 may transmit and/or receive traffic 360 (e.g., via network 100) when the operational state of managed node 120 is enabled.

Although FIG. 3 shows exemplary components of network portion 300, in other embodiments, network portion 300 may contain fewer, different, or additional components than depicted in FIG. 3. In still other embodiments, one or more components of network portion 300 may perform one or more tasks described as being performed by one or more other components of network portion 300.

Figure 4:
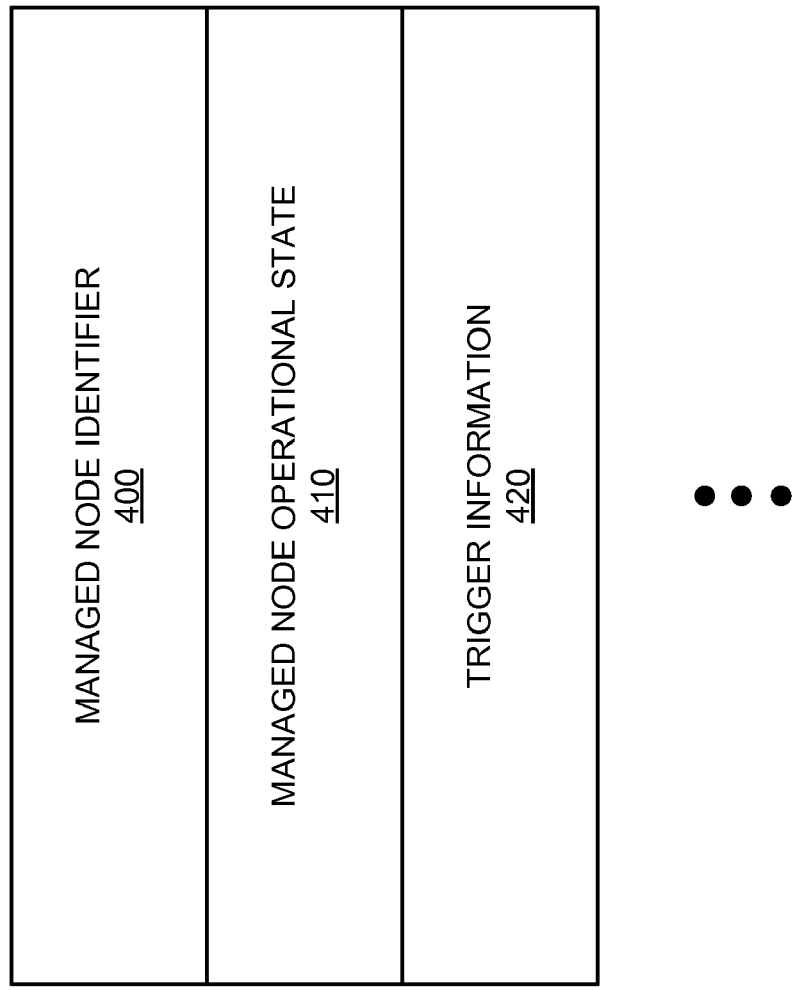
FIG. 4 depicts a diagram of exemplary elements of a fetch request capable of being provided by the managed node of the network illustrated in FIG. 1.

FIG. 4 illustrates a diagram of exemplary elements of fetch request 320. In one embodiment, fetch request 320 may be provided by a managed device (e.g., managed node 120). In another embodiment, fetch request 320 may be provided by a managed device (e.g., other managed nodes) other than or in addition to managed node 120. As illustrated, fetch request 320 may include a managed node identifier parameter 400, a managed node operational state parameter 410, and/or a trigger information parameter 420. In one embodiment, managed node 120 may generate fetch request 320 when it is ready to enter into an enabled operational state.

Managed node identifier parameter 400 may include information that identifies a managed node (e.g., managed node 120) requesting trigger information (e.g., trigger information 330). For example, in one embodiment, managed node identifier parameter 400 may include identification information (e.g., an address) associated with managed node 120.

Managed node operational state parameter 410 may include information that identifies an operational state associated with managed node 120. For example, in one embodiment, managed node operational state parameter 410 may include an enabled or a disabled state associated with managed node 120.

Trigger information parameter 420 may include an output parameter that causes domain manager 110 to provide trigger information (e.g., trigger information 330) to managed node 120. For example, in one embodiment, trigger information parameter 420 may cause domain manager 110 to provide trigger information 330 described below in connection with, for example, FIG. 5.

In one exemplary embodiment, fetch request 320 may include the following format: fetchTriggerInfo(managedNodeId, managedNodeOperationalState): triggerinfo, where managedNodeId may correspond to managed node identifier parameter 400, managedNodeOperationalState may correspond to managed node operational state parameter 410, and triggerinfo may correspond to trigger information parameter 420. Managed node 120 may provide fetch request 320 to domain manager 110, and domain manager 110 may identify managed node 120 and its operational state based on fetch request 320. Domain manager 110 may provide trigger information 330 to managed node 120 in response to receiving trigger information parameter 420.

Although FIG. 4 shows exemplary elements of fetch request 320, in other embodiments, fetch request 320 may contain fewer, different, or additional elements than depicted in FIG. 4.

Figure 5:
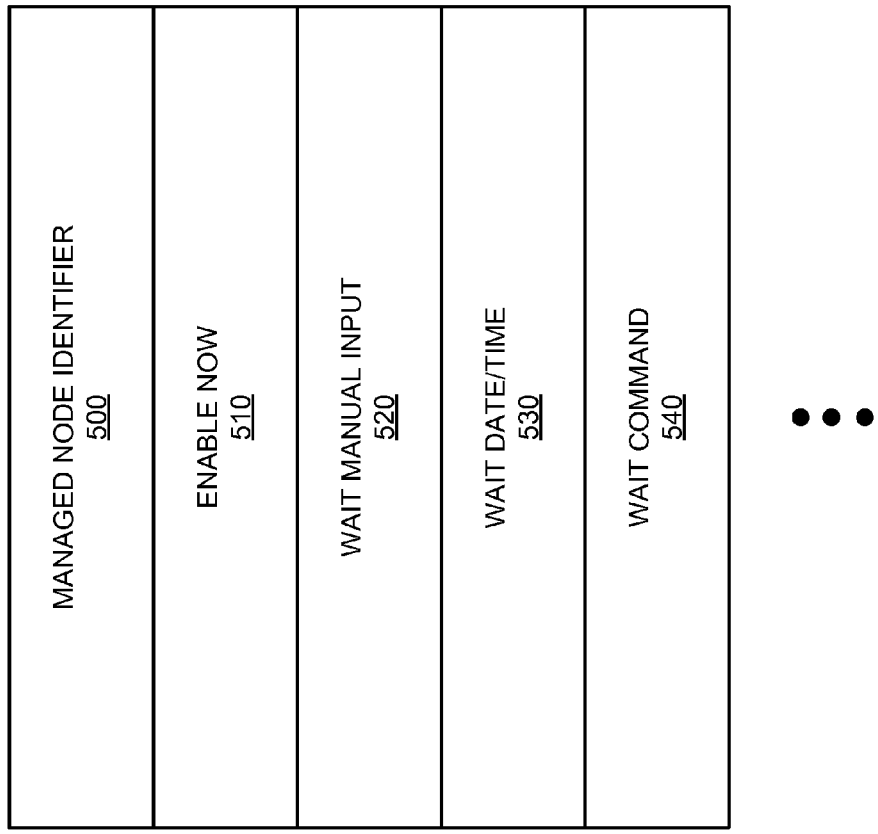
FIG. 5 illustrates a diagram of exemplary elements of trigger information capable of being provided by the domain manager of the network depicted in FIG. 1.

FIG. 5 depicts a diagram of exemplary elements of trigger information 330. In one embodiment, trigger information 330 may be provided by a managing device (e.g., domain manager 110). In another embodiment, trigger information 330 may be provided by a managing device (e.g., other domain managers) other than or in addition to domain manager 110. In one exemplary embodiment, trigger information 330 may be prepared by a network operator (e.g., as part of a pre-plan configuration), and may be stored in (e.g., in storage device 220) and/or maintained by domain manager 110.

As illustrated in FIG. 5, trigger information 330 may include a managed node identifier attribute 500 and a group of trigger conditions (e.g., an enable now attribute 510, a wait manual input attribute 520, a wait date/time attribute 530, and a wait command attribute 540). Although four trigger conditions are depicted in FIG. 5, in other embodiments, trigger information 330 may include more or less trigger conditions. In one embodiment, one or more trigger conditions may be specified for managed node 120 as part of trigger information 330. If multiple trigger conditions are used, a trigger condition that can be achieved the earliest may be used by managed node 120 and managed node 120 may ignore the other trigger conditions.

Managed node identifier attribute 500 may include information that identifies one or more managed nodes (e.g., managed node 120) receiving trigger information 330. For example, in one embodiment, managed node identifier attribute 500 may include identification information (e.g., an address) associated with managed node 120.

Enable now attribute 510 may include information (e.g., a trigger condition) that may instruct managed node 120 to immediately enter an enabled operational state. For example, in one embodiment, enable now attribute 510 may include a Boolean (e.g., yes or no) command that may or may not instruct managed node 120 to immediately enter an enabled operational state.

Wait manual input attribute 520 may include information (e.g., a trigger condition) that may instruct managed node 120 to wait for manual instruction (e.g., from a user of managed node) before entering an enabled operational state. For example, in one embodiment, wait manual input attribute 520 may include a Boolean (e.g., yes or no) command that may or may not instruct managed node 120 to wait for manual instruction before entering an enabled operational state.

Wait date/time attribute 530 may include information (e.g., a trigger condition) that may indicate a date and/or time when managed node 120 may enter an enabled operational state (e.g., may transmit/receive traffic).

Wait command attribute 540 may include information (e.g., a trigger condition) that may instruct managed node 120 to wait for an instruction (e.g., from domain manager 110) before entering an enabled operational state. For example, in one embodiment, wait command attribute 540 may include a Boolean (e.g., yes or no) command that may or may not instruct managed node 120 to wait for an instruction from domain manager 110 before entering an enabled operational state. In contrast to wait manual input attribute 520, which may instruct managed node 120 to wait for manual input (e.g., from a user of managed node 120) before entering an enabled operational state, wait command attribute 540 may instruct managed node 120 to wait for command from domain manager 110 before entering an enabled operational state.

In one exemplary embodiment, trigger information 330 may include the following format:
    managedNodeIds: String="xyz" (that denotes managed node 120)
    enableNow: Boolean=No
    waitManualInput: Boolean=No
    waitDateAndTime: DateAndTime=Jun. 30, 2008, 10:00 AM
    waitDMCommand: Boolean=Yes where managedNodeIds may correspond to managed node identifier attribute 500, enableNow may correspond to enable now attribute 510, waitManualInput may correspond to wait manual input attribute 520, waitDateAndTime may correspond to wait date/time attribute 530, and waitDMCommand may correspond to wait command attribute 540. Domain manager 110 may provide trigger information 330 to managed node 120, and managed node 120 may determine its operational state (e.g., and provide it to domain manager 110) based on trigger information 330. For example, in one embodiment, managed node 120 may be enabled based on one or more of the trigger conditions specified by enable now attribute 510, wait manual input attribute 520, wait date/time attribute 530, and/or wait command attribute 540.

Although FIG. 5 shows exemplary elements of trigger information 330, in other embodiments, trigger information 330 may contain different or additional elements than depicted in FIG. 5.

Figure 6:
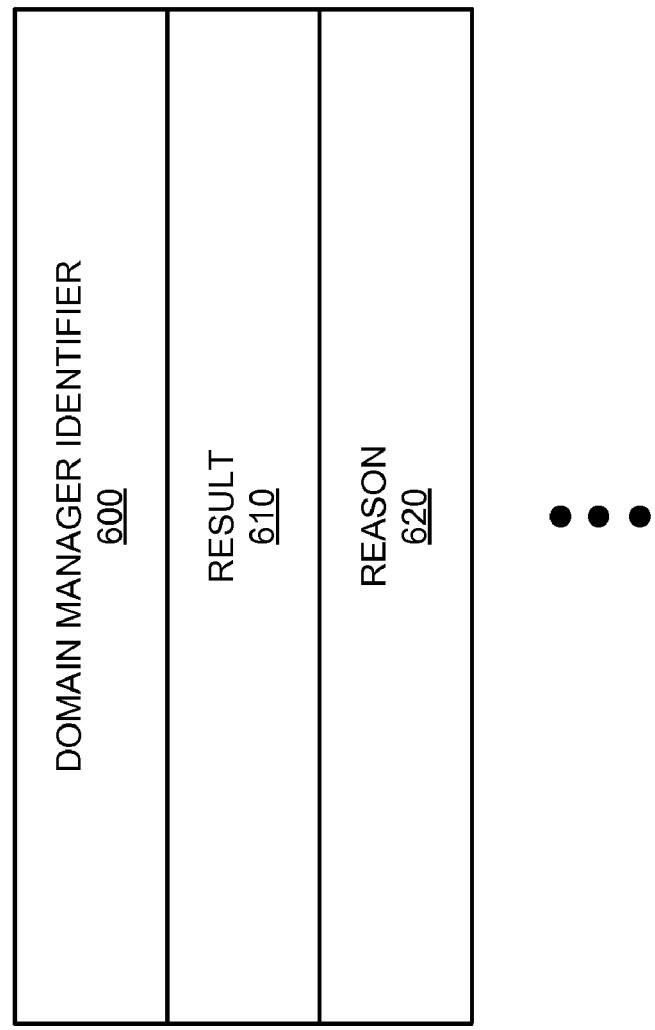
FIG. 6 depicts a diagram of exemplary elements of an enable operation instruction capable of being provided by the domain manager of the network illustrated in FIG. 1.

FIG. 6 illustrates a diagram of exemplary elements of enable operation instruction 340. In one embodiment, enable operation instruction 340 may be provided by a managing device (e.g., domain manager 110). In another embodiment, enable operation instruction 340 may be provided by a managing device (e.g., other domain managers) other than or in addition to domain manager 110. In one exemplary embodiment, enable operation instruction 340 may be stored in (e.g., in storage device 220) and/or maintained by domain manager 110. Enable operation instruction 340 may immediately change an operational state of managed node 120 to an enabled state, regardless of the trigger conditions provided by trigger information 330. As illustrated in FIG. 6, enable operation instruction 340 may include a domain manager identifier parameter 600, a result parameter 610, and/or a reason parameter 620.

Domain manager identifier parameter 600 may include information that identifies a managing device (e.g., domain manager 110) providing enable operation instruction 340. For example, in one embodiment, domain manager identifier parameter 600 may include information identifying domain manager 110 as the device providing enable operation instruction.

Result parameter 610 may include an output parameter that indicates if an operation implemented on a managed device (e.g., managed node 120) is successful (e.g., managed node 120 operational state is enabled) or not (e.g., managed node 120 operational state is disabled). For example, in one embodiment, result parameter 610 may cause managed node 120 to provide an indication (e.g., enabled or disabled) regarding an operational state of managed node 120.

Reason parameter 620 may include an output parameter that provides a reason why an operational state of a managed device (e.g., managed node 120) should remain or enter into a disabled state. For example, in one embodiment, reason parameter 620 may indicate that managed node 120 should remain in a disabled state to prevent network traffic from being transmitted to and/or received by managed node 120.

In one exemplary embodiment, enable operation instruction 340 may include the following format: enable(dMId): result, reason, where dMId may correspond to domain manager identifier parameter 600, result may correspond to result parameter 610, and reason may correspond to reason parameter 620. Domain manager 110 may provide enable operation instruction 340 to managed node 120, and managed node 120 may immediately change its operational state to an enabled state based on enable operation instruction 340, regardless of the trigger conditions provided by trigger information 330.

Although FIG. 6 shows exemplary elements of enable operation instruction 340, in other embodiments, enable operation instruction 340 may contain fewer, different, or additional elements than depicted in FIG. 6.

FIGS. 7-10 depict flow charts of an exemplary process 700 for providing an initial operational state for managed node 120 according to embodiments described herein. In one embodiment, process 700 may be performed by hardware and/or software components of domain manager 110. In other embodiments, process 700 may be performed by hardware and/or software components of domain manager 110 in combination with hardware and/or software components of another device or group of devices (e.g., communicating with domain manager 110).

Figure 7:
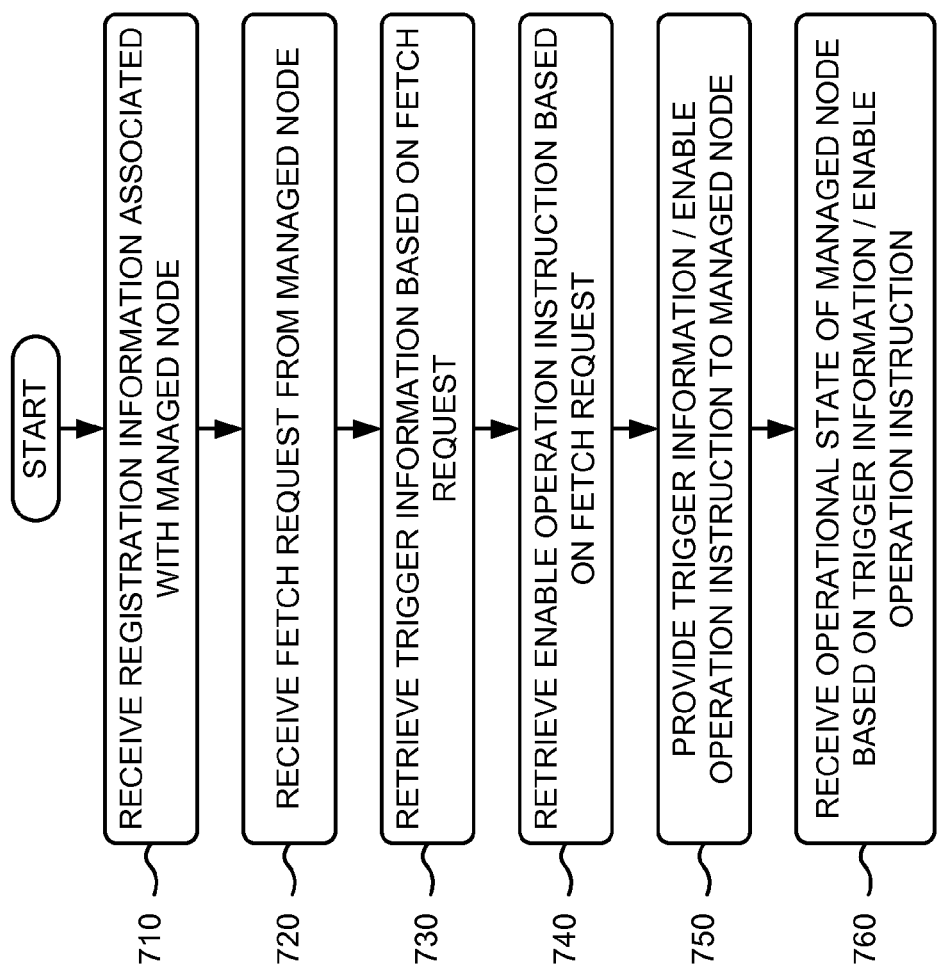
FIGS. 7-14 illustrate flow charts of exemplary processes for providing an initial operational state for a managed node according to embodiments described herein.

As illustrated in FIG. 7, process 700 may begin with receipt of registration information associated with a managed node (block 710), and receipt of a fetch request from the managed node (block 720). For example, in embodiments described above in connection with FIG. 3, managed node 120 may provide registration information 310 to domain manager 110. Registration information 310 may include information identifying managed node 120, information regarding connection of managed node 120 (e.g., to network 100), authentication information, etc. Domain manager 110 may receive registration information 310, and may identify, authenticate, etc. managed node 120 based on registration information 310. Managed node 120 may provide fetch request 320 to domain manager 110. Fetch request 320 may include information identifying managed node 120, information identifying an operational state of managed node 120, information requesting an initial operational state for managed node 120, etc. Domain manager 110 may receive fetch request 320.

Returning to FIG. 7, trigger information may be retrieved based on the fetch request (block 730), and/or an enable operation instruction may be retrieved based on the fetch request (block 740). For example, in embodiments described above in connection with FIG. 3, domain manager 110 may retrieve trigger information 330 from storage (e.g., storage device 220) based on fetch request 320. Trigger information 330 may include information specifying conditions under which managed node 120 may enter an operational state (e.g., enabled, disabled, etc.). Alternatively and/or additionally, domain manager 110 may retrieve enable operation instruction 340 from storage (e.g., storage device 220) based on fetch request 320. Enable operation instruction 340 may include information that changes a state of managed node 120 to an enabled operational state.

As further shown in FIG. 7, the trigger information and/or the enable operation instruction may be provided to the managed node (block 750), and an operational state of the managed node may be received based on the trigger information and/or the enable operation instruction (block 760). For example, in embodiments described above in connection with FIG. 3, domain manager 110 may provide trigger information 330 and/or enable operation instruction 340 to managed node 120. Managed node 120 may receive trigger information 330 and/or enable operation instruction 340, may change its operational state based on trigger information 330 and/or enable operation instruction 340, and may determine its operational state 350 (e.g., whether managed node 120 is enabled, disabled, etc.) based on trigger information 330 and/or enable operation instruction 340. In one example, managed node 120 may determine that its operational state is enabled from trigger information 330 (and/or enable operation instruction 340). Managed node 120 may provide operational state 350 to domain manager 110, and domain manager 110 may receive operational state 350.

Figure 8:
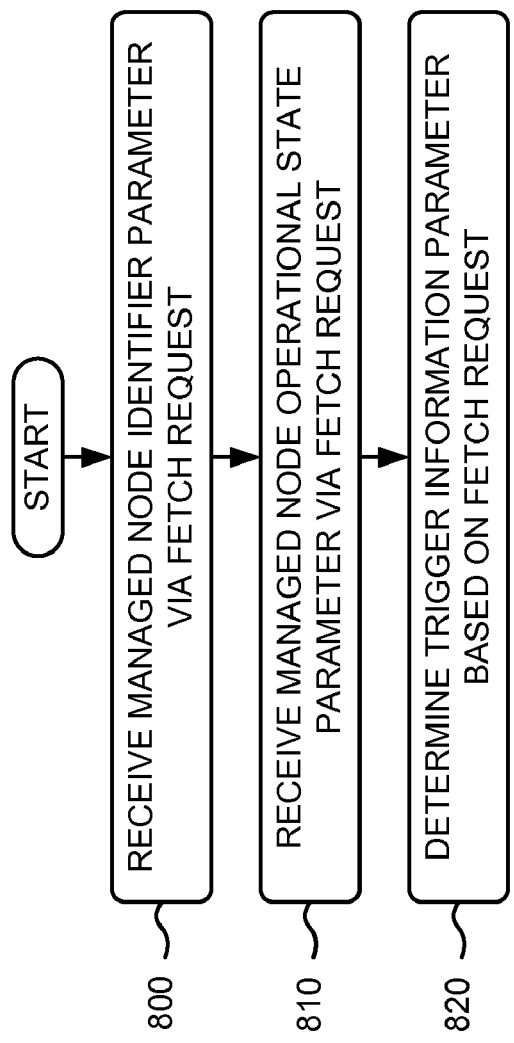

Process block 720 may include the process blocks depicted in FIG. 8. As illustrated in FIG. 8, process block 720 may include receiving a managed node identifier parameter via the fetch request (block 800), receiving a managed node operational state parameter via the fetch request (block 810), and determining a trigger information parameter based on the fetch request (block 820). For example, in embodiments described above in connection with FIG. 4, fetch request 320 may be received by domain manager 110, and may include managed node identifier parameter 400, managed node operational state parameter 410, and/or trigger information parameter 420. Managed node identifier parameter 400 may include information that identifies a managed node (e.g., managed node 120) receiving trigger information 330. Managed node operational state parameter 410 may include information that identifies an operational state associated with managed node 120. Trigger information parameter 420 may include an output parameter that causes domain manager 110 to provide trigger information (e.g., trigger information 330) to managed node 120.

Figure 9:
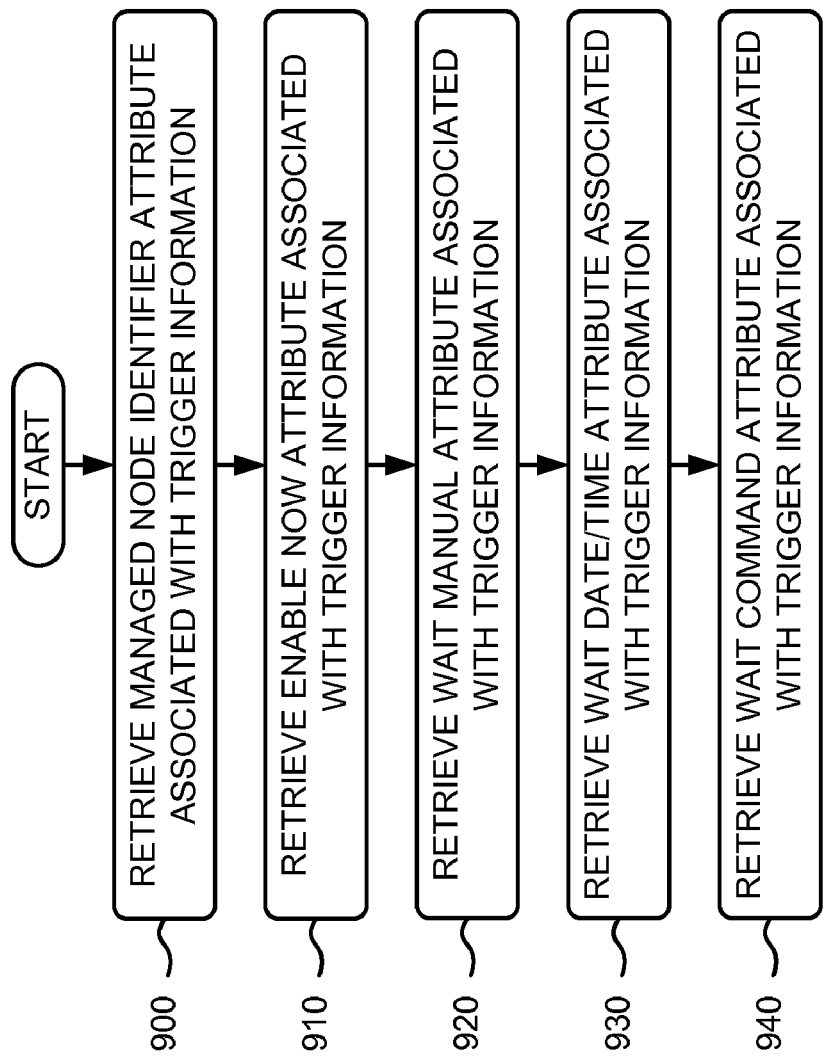

Process block 730 may include the process blocks depicted in FIG. 9. As illustrated in FIG. 9, process block 730 may include one or more of retrieving a managed node identifier attribute associated with the trigger information (block 900), retrieving an enable now attribute associated with the trigger information (block 910), retrieving a wait manual attribute associated with the trigger information (block 920), retrieving a wait date/time attribute associated with the trigger information (block 930), and/or retrieving a wait command attribute associated with the trigger information (block 940). For example, in embodiments described above in connection with FIG. 5, domain manager 110 may retrieve trigger information 330 that may include managed node identifier attribute 500 and a group of trigger conditions (e.g., enable now attribute 510, wait manual input attribute 520, wait date/time attribute 530, and wait command attribute 540). Managed node identifier attribute 500 may include information that identifies one or more managed nodes (e.g., managed node 120) and the trigger information (e.g., trigger information 330) associated with the one or more managed nodes. Enable now attribute 510 may include a trigger condition that may instruct managed node 120 to immediately enter an enabled operational state. Wait manual input attribute 520 may include a trigger condition that may instruct managed node 120 to wait for manual instruction (e.g., from a user of managed node) before entering an enabled operational state. Wait date/time attribute 530 may include a trigger condition that may indicate a date and time when managed node 120 may enter an enabled operational state. Wait command attribute 540 may include a trigger condition that may instruct managed node 120 to wait for an instruction (e.g., from domain manager 110) before entering an enabled operational state.

Figure 10:
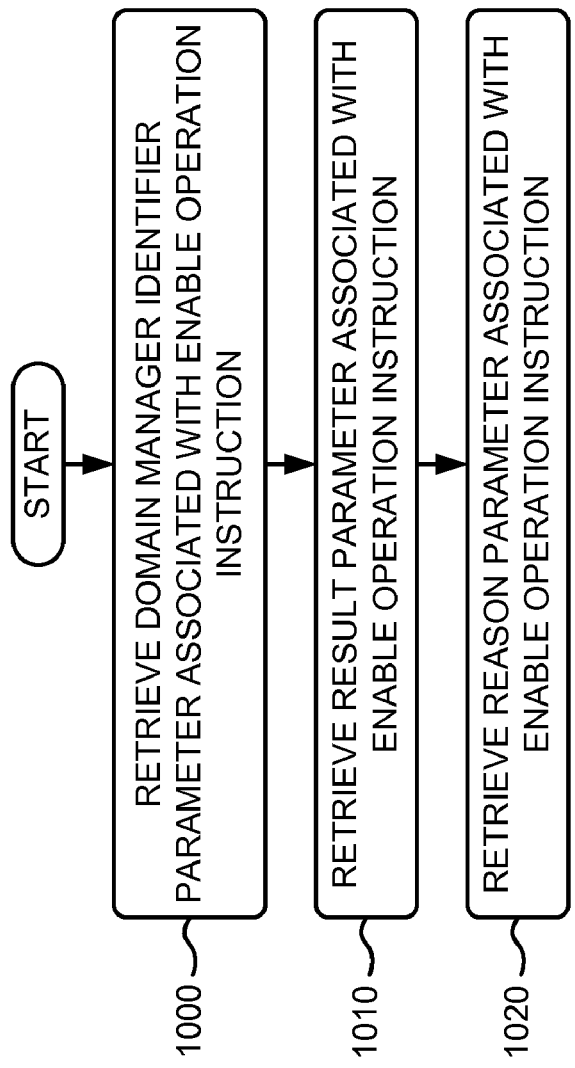

Process block 740 may include the process blocks depicted in FIG. 10. As illustrated in FIG. 10, process block 740 may include retrieving a domain manager identifier parameter associated with the enable operation instruction (block 1000), retrieving a result parameter associated with the enable operation instruction (block 1010), and retrieving a reason parameter associated with the enable operation instruction (block 1020). For example, in embodiments described above in connection with FIG. 6, domain manager 110 may retrieve enable operation instruction 340 that includes domain manager identifier parameter 600, result parameter 610, and/or reason parameter 620. Domain manager identifier parameter 600 may include information that identifies a managing device (e.g., domain manager 110) providing enable operation instruction 340. Result parameter 610 may include an output parameter that indicates if an operation implemented on a managed device (e.g., managed node 120) is successful (e.g., managed node 120 operational state is enabled) or not (e.g., managed node 120 operational state is disabled). Reason parameter 620 may include an output parameter that provides a reason why an operational state of a managed device (e.g., managed node 120) should remain or enter into a disabled state.

FIGS. 11-14 depict flow charts of an exemplary process 1100 for providing an initial operational state for managed node 120 according to embodiments described herein. In one embodiment, process 1100 may be performed by hardware and/or software components of managed node 120. In other embodiments, process 1100 may be performed by hardware and/or software components of managed node 120 in combination with hardware and/or software components of another device or group of devices (e.g., communicating with managed node 120).

Figure 11:
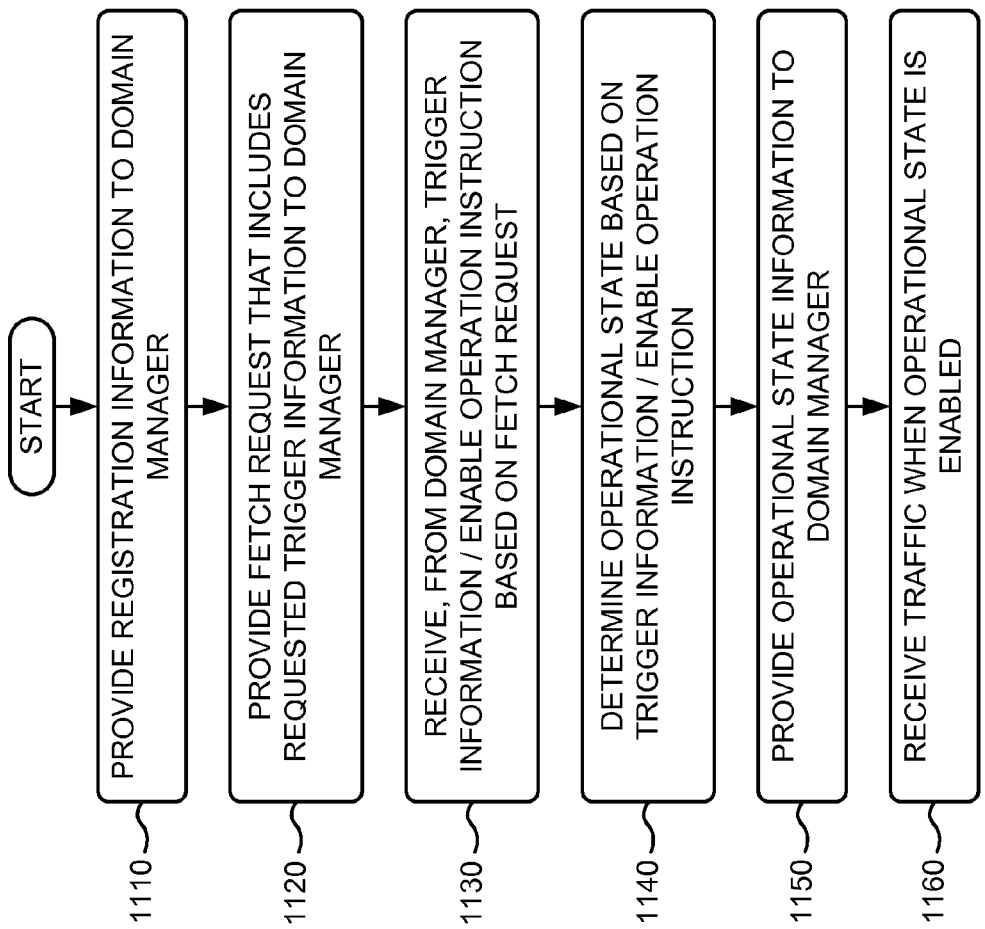

As illustrated in FIG. 11, process 1100 may begin with providing registration information to a domain manager (block 1110), and providing a fetch request that includes requested trigger information to the domain manager (block 1120). For example, in embodiments described above in connection with FIG. 3, managed node 120 may provide registration information 310 to domain manager 110. Registration information 310 may include information identifying managed node 120, information regarding connection of managed node 120 (e.g., to network 100), authentication information, etc. Managed node 120 may provide fetch request 320 to domain manager 110. Fetch request 320 may include information identifying managed node 120, information identifying an operational state of managed node 120, information requesting an initial operational state for managed node 120, etc.

As further shown in FIG. 11, trigger information and/or an enable operation instruction may be received from the domain manager based on the fetch request (block 1130), and an operational state may be determined based on the trigger information and/or the enable operation instruction (block 1140). For example, in embodiments described above in connection with FIG. 3, managed node 120 may receive trigger information 330 and/or enable operation instruction 340, may change its operational state based on trigger information 330 and/or enable operation instruction 340, and may determine its operational state 350 (e.g., whether managed node 120 is enabled, disabled, etc.) based on trigger information 330 and/or enable operation instruction 340. In one example, if both trigger information 330 and enable operation instruction 340 are received by managed node 120, enable operation instruction 340 may immediately change an operational state of managed node 120 to an enabled state, regardless of the trigger conditions provided by trigger information 330.

Returning to FIG. 11, operational state information may be provided to the domain manager (block 1140), and traffic may be received when the operational state is enabled (block 1150). For example, in embodiments described above in connection with FIG. 3, managed node 120 may provide operational state 350 (e.g., whether managed node 120 is enabled, disabled, etc.) to domain manager 110. Managed node 120 may transmit and/or receive traffic 360 (e.g., via network 100) when the operational state of managed node 120 is enabled. Such an arrangement may assure that network traffic (e.g., traffic 360) may be transmitted and/or received by managed node 120 at time specified by a network operator (e.g., via a pre-plan configuration). In one example, a user (e.g., a customer) of managed node 120 may install managed node 120 (e.g., at his/her home) at any time, without the need to coordinate with a network operator (e.g., a service provider), because domain manager 110 may control (e.g., via trigger information 330) when managed node 120 may be enabled and receive traffic 360.

Figure 12:
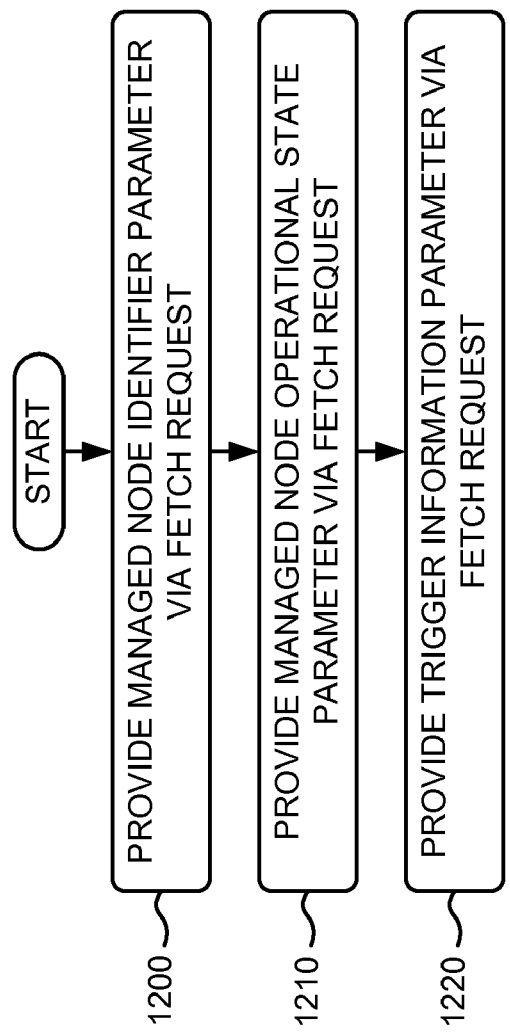

Process block 1120 may include the process blocks depicted in FIG. 12. As illustrated in FIG. 12, process block 1120 may include providing a managed node identifier parameter via the fetch request (block 1200), providing a managed node operational state parameter via the request (block 1210), and providing a trigger information parameter via the fetch request (block 1220). For example, in embodiments described above in connection with FIG. 4, managed node 120 may provide fetch request 320 that may include managed node identifier parameter 400, managed node operational state parameter 410, and/or trigger information parameter 420. Managed node identifier parameter 400 may include information that identifies a managed node (e.g., managed node 120) requesting trigger information (e.g., trigger information 330). Managed node operational state parameter 410 may include information that identifies an operational state associated with managed node 120. In one example, managed node identifier parameter 400 may provide an address of managed node 120, and managed node operational state parameter 410 may indicate that managed node is disabled. Trigger information parameter 420 may include an output parameter that causes domain manager 110 to provide trigger information (e.g., trigger information 330) to managed node 120.

Figure 13:
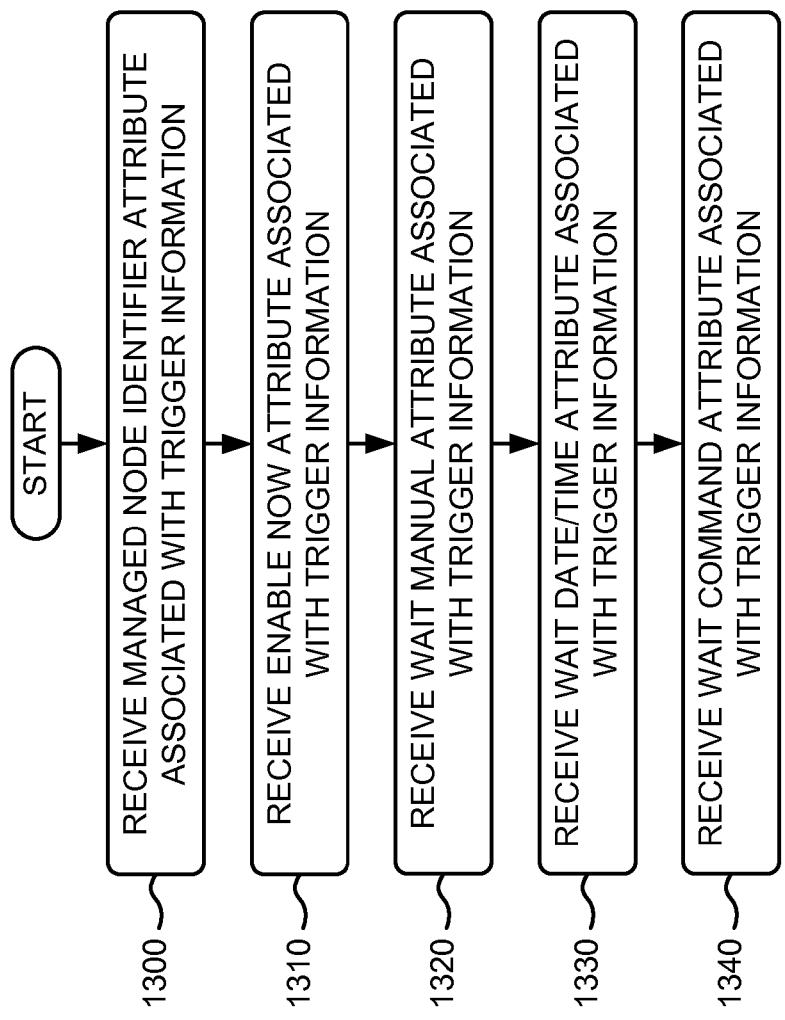

Process block 1130 may include the process blocks depicted in FIG. 13. As illustrated in FIG. 13, process block 1130 may include one or more of receiving a managed node identifier attribute associated with the trigger information (block 1300), receiving an enable now attribute associated with the trigger information (block 1310), receiving a wait manual attribute associated with the trigger information (block 1120), receiving a wait date/time attribute associated with the trigger information (block 1130), and/or receiving a wait command attribute associated with the trigger information (block 1140). For example, in embodiments described above in connection with FIG. 5, managed node 120 may receive trigger information 330 that may include managed node identifier attribute 500 and a group of trigger conditions (e.g., enable now attribute 510, wait manual input attribute 520, wait date/time attribute 530, and wait command attribute 540). Managed node 120 may be enabled based on one or more of the trigger conditions 510-540. Managed node identifier attribute 500 may identify managed node 120 and trigger information 330 associated with managed node 120. Enable now attribute 510 may include a trigger condition that may instruct managed node 120 to immediately enter an enabled operational state. Wait manual input attribute 520 may include a trigger condition that may instruct managed node 120 to wait for manual instruction (e.g., from a user of managed node) before entering an enabled operational state. Wait date/time attribute 530 may include a trigger condition that may indicate a date and time when managed node 120 may enter an enabled operational state. Wait command attribute 540 may include a trigger condition that may instruct managed node 120 to wait for an instruction (e.g., from domain manager 110) before entering an enabled operational state.

Figure 14:
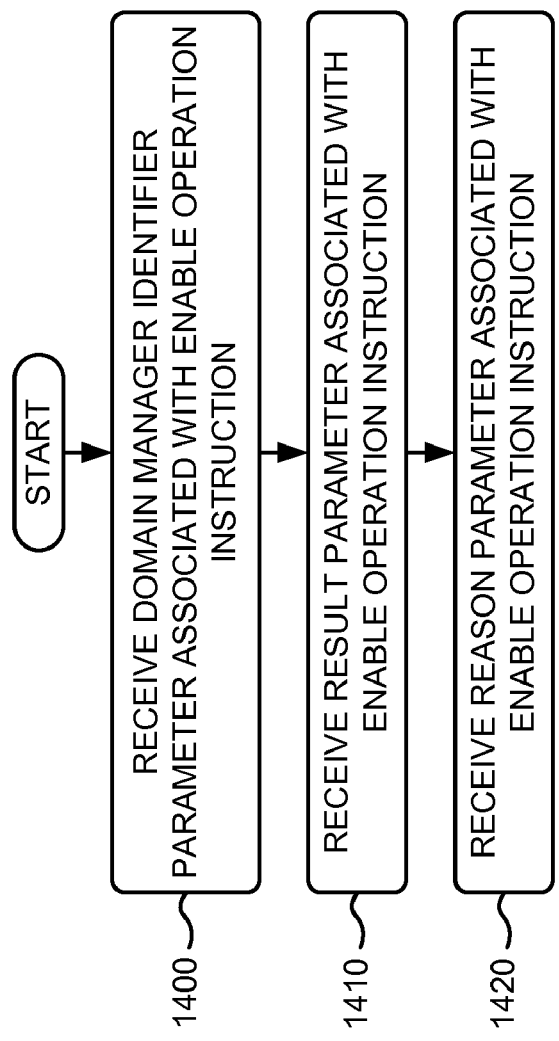

Alternatively and/or additionally, process block 1130 may include the process blocks depicted in FIG. 14. As illustrated in FIG. 14, process block 1130 may include receiving a domain manager identifier parameter associated with the enable operation instruction (block 1400), receiving a result parameter associated with the enable operation instruction (block 1410), and receiving a reason parameter associated with the enable operation instruction (block 1420). For example, in embodiments described above in connection with FIG. 6, managed node 120 may receive enable operation instruction 340 that may include domain manager identifier parameter 600, result parameter 610, and/or reason parameter 620. Domain manager identifier parameter 600 may include information (e.g., an address) that identifies domain manager 110. Result parameter 610 may include an output parameter that indicates if an operation implemented on managed node 120 is successful (e.g., managed node 120 operational state is enabled) or not (e.g., managed node 120 operational state is disabled). Reason parameter 620 may include an output parameter that provides a reason why an operational state of managed node 120 should remain or enter into a disabled state. In one example, enable operation instruction 340 may cause managed node 120 to immediately change its operational state to an enabled state, regardless of the trigger conditions provided by trigger information 330.

Embodiments described herein may include systems and/or methods that provide an initial operational state for a managed node so that a domain manager may initiate a dialog with the managed node (e.g., prior to enabling operation of the managed node), and may determine when the managed node is to become operational.

Embodiments described herein may provide a variety of advantages. For example, embodiments described herein may control conditions under which a managed device (e.g., managed node 120) may be enabled (e.g., transmit/receive traffic) via pre-plan trigger information provided by a managing device (e.g., domain manager 110). By controlling enablement of managed node 120, domain manager 110 need not predict when managed node 120 will be installed and connected to a network (e.g., network 130). Such an arrangement may be particularly beneficial for managing SON-based managed nodes.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 7-14, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary embodiments, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. The logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device associated with a network, the method comprising:
   receiving, by the device, configuration information associated with a disabled managed node of the network;
   determining, by the device and based on the configuration information, trigger information specifying one or more conditions when the managed node is to be enabled for handling traffic associated with the network;
   providing, by the device, the trigger information to the managed node, where the managed node remains disabled until the one or more conditions provided by the trigger information are satisfied; and
   receiving, by the device and based on the trigger information, information identifying whether the managed node is enabled or disabled.

* * * * *

UNITED STATES PATENT AND TRADEMARK OFFICE
CERTIFICATE OF CORRECTION

PATENT NO. : 7,899,890 B2  Page 1 of 1
APPLICATION NO. : 12/783887
DATED : March 1, 2011
INVENTOR(S) : Petersen et al.

It is certified that error appears in the above-identified patent and that said Letters Patent is hereby corrected as shown below:

In Column 6, Line 64, delete "triggerinfo," and insert -- triggerInfo, --, therefor.

In Column 7, Line 1, delete "triggerinfo" and insert -- triggerInfo --, therefor.

Signed and Sealed this
Twenty-seventh Day of September, 2011

David J. Kappos
*Director of the United States Patent and Trademark Office*